Patented June 2, 1931

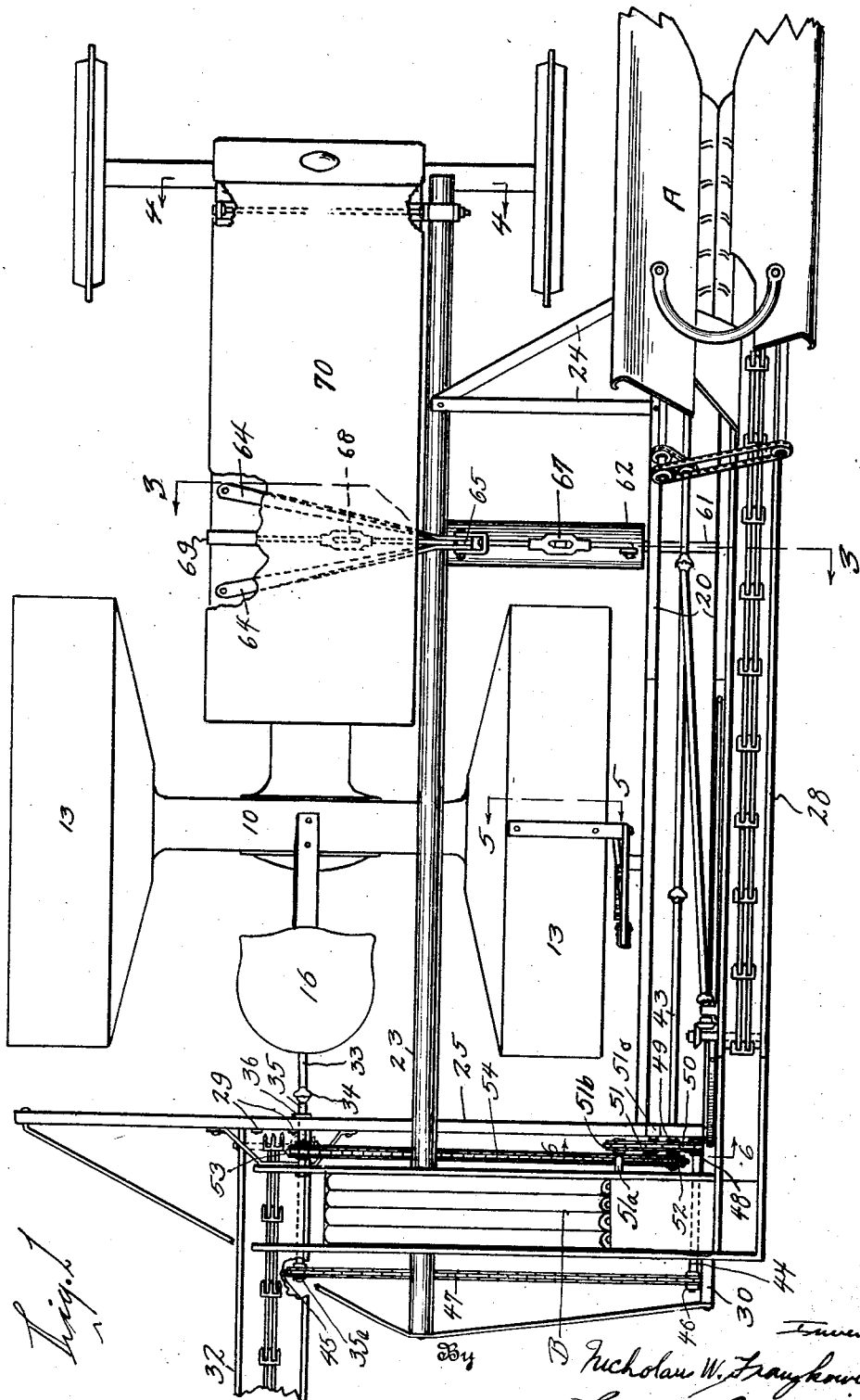

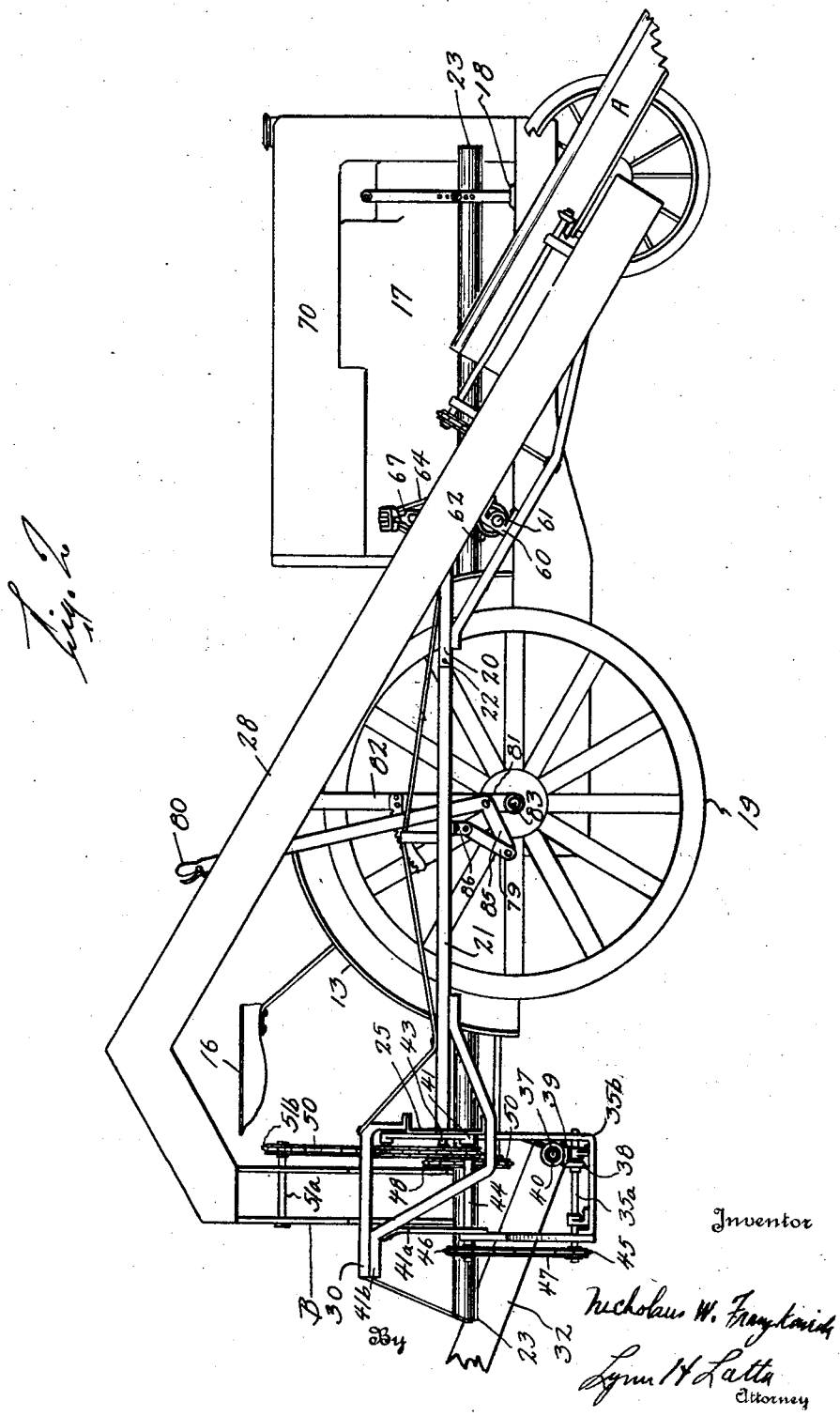

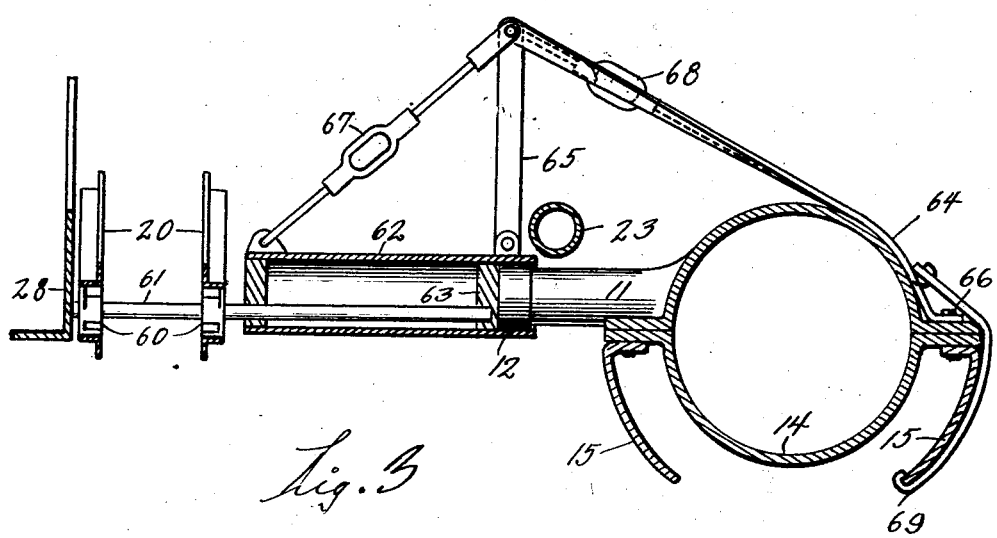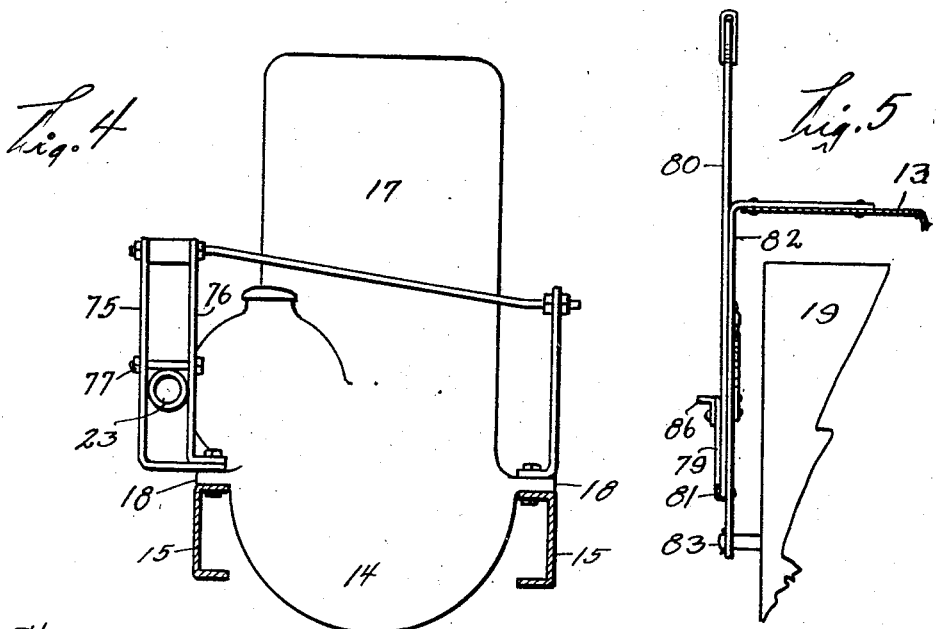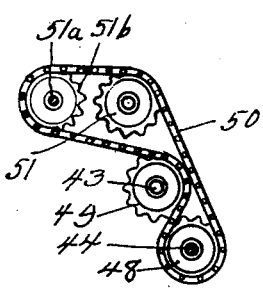

1,808,030

UNITED STATES PATENT OFFICE

NICHOLAUS W. FRANZKOWIAK, OF SCHALLER, IOWA

CORN PICKER ATTACHMENT FOR TRACTORS

Application filed March 3, 1930. Serial No. 432,603.

My invention relates to power driven corn pickers and has for its object to provide a corn picker unit which can be attached to a common type of tractor without any change in the existing structure of the tractor.

My invention utilizes the belt pulley shaft housing of this tractor or of a similar tractor as a fulcrum upon which the corn picker is hung and an object of my invention is to provide a device for attaching the frame of the picker to this belt pulley shaft housing.

My invention further contemplates the mounting of the corn picker attachment in such a manner that it may be tilted vertically around the belt pulley shaft housing as an axis and an object of my invention is to provide means carried by the attachment and attachable to another portion of the tractor for adjusting the vertical tilt of the corn picker.

Another object is to arrange the tilting mechanism just mentioned so that it may be accessible from the seat of the tractor.

Another object is to provide means for connecting the frame of the attachment to the tractor so as to brace it against lateral movement relative to the tractor without interfering with the tilting movement hereinbefore referred to.

Another object is to arrange the lateral bracing means so that it can be readily associated with or disassociated from the tractor.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a plan view of a tractor with my invention attached thereto.

Fig. 2 is a side elevation of the same.

Fig. 3 is a detail, sectional view taken on the line 3—3 of Fig. 1.

Fig. 4 is a detail, sectional view taken on the line 4—4 of Fig. 1, and

Fig. 5 is a detail, sectional view taken on the line 5—5 of Fig. 1.

Fig. 6 is a detail view taken on the line 6—6 of Fig. 1.

The tractor shown in the accompanying drawings has several distinctive features of construction, among which are the belt pulley shaft housing 11, which may be closed by a threaded cap 12, provided for it when the belt pulley is not being used. (See Fig. 3.) The rear wheel fenders are shown at 13, the rear axle housing at 10, the body housing at 14, the frame side rails at 15, the seat at 16, the engine at 17 and the front engine brackets at 18 (Fig. 4). The rear wheels of the tractor are shown at 19.

Corn picker attachment

The corn picker attachment embodies a picking unit of conventional construction which is indicated generally by the reference character A. The two longitudinal frame members 20 of the picker are extended rearwardly by means of extension arms 21. If the attachment is built so as to utilize a picker unit from an old corn picker construction, the arms 21 are attached at 22 to the frame members 20, otherwise they will be formed integrally therewith.

The frame of the attachment includes the members 20 and 21 just described and a long beam or tube 23 which is secured near its forward end to the picker unit by means of hanger straps 24 and at its rearward end is secured to the extension arms 21 by means of a transverse, rear frame member 25, preferably of channel construction as shown in Fig. 2.

It will thus be seen that the frame members 20 and their extension arms 21, the beam 23 positioned parallel thereto and the connecting members 24 and 25 form a substantially rectangular frame which provides an open area to receive the right hind wheel 19 of the tractor and the fender 13.

The braces 24 are made detachable from the inner frame member 20, to which they attach for a purpose which will hereinafter appear.

The extension arms 21 and beam 23 are positioned parallel to each other and inclined relative to the frame of the picker unit proper, whereby when the attachment is installed, the former members will be substantially horizontal.

A husking unit B is mounted on the beam 23, and a bracket 30 secured to and projecting rearwardly from the cross member 25. The husking unit is thereby positioned transversely behind the tractor with its discharge end even with the longitudinal axis thereof, whereby the wagon elevator 32 may be positioned centrally behind the tractor.

The elevator 32 is supported from the beam 25 by hanger straps 29 (Fig. 1).

Power connections

An elevator 28 connects the picker unit A with the husking unit B.

The reason for such positioning of the elevator 32 lies in the desirability of driving from an extension 33 of the axial power take-off shaft of the tractor.

The extension 33 is connected by a universal joint and a slip clutch (not shown) to the axle power take-off shaft of the tractor. It is connected by a universal joint 34 to a short shaft 35, suitably journalled in a bracket 36, carried by the beam 25 and in one side of the husking unit B.

The picking unit A is driven by an extension shaft 43, coupled with the picker drive shaft so as to transmit power to the picker at the usual point and the shaft 43 receives power from the shaft 35 through the medium of a chain 54 and a pair of sprockets 52 and 53 on the shafts 43 and 35, respectively.

The shaft 43 thus receives power from the shaft 35.

In turn the shaft 43 is provided with a sprocket 49, positioned side by side with the sprocket 52 or formed integrally therewith which serves to drive a chain 50 extending around a sprocket 48 on the shaft 44 journalled in a bracket 41 and a bracket 41a carried by the cross beam 25 and the brace 41b, respectively. The brace 41b serves to brace the bracket 30. The shaft 44 is provided with a sprocket 46 which is connected to a sprocket 45 on a shaft 35a by means of a chain 47. The shaft 35a is mounted in a bracket 35b supported from the beam 25.

The elevator 32 is mounted at its rear end in position to receive power from the shaft 35a through the medium of a bevel gear 38 on the shaft 35a, a double bevel gear 39 journalled on a vertical axis and a bevel gear 40 on the elevator shaft 37 (Fig. 2).

The chain 50 serves not only to drive the shaft 44 and elevator but also to drive the husking unit shaft 51a which is provided with a sprocket 57b. An idler sprocket 51 is mounted in the bracket 51c (Fig. 1) on the beam 25 and serves to carry the chain 50 over the sprocket 49.

Having described the attachment itself, the tractor and the power connection, I will proceed to a description of close features which form the major portion of my invention, namely, the

Attachment means

Journalled in the frame of the picker unit A as by means of the brackets 60 is a shaft 61. The shaft 61 is rigidly mounted in a sleeve 62, which is of the proper diameter to receive the cap 12 (Fig. 4) of the belt pulley shaft 11. An abutment 63 within the sleeve 62 serves to correctly position the sleeve 62 relative to the housing 11 so that the distance between the body of the tractor and the picker attachment will be correct. The sleeve 62 is intended to slip freely over the cap 12 and is then secured in place by means of a pair of braces 64, secured at one end to a post 65, carried by the sleeve 62 and adapted to be secured at their other ends to a portion of the body housing 14 as at 66. The sleeve 62 is supported by a tension rod and turn buckle assembly 67 connected to the sleeve at one end and to the post 65 at the other.

A similar tension rod and turn buckle assembly 68 is connected between the post and a hook 69 adapted to engage beneath the tractor rail 15 on the side of the tractor, also the picker attachment. The members 64 and 68 are adapted to extend beneath the gasoline tank 70 of the tractor.

The beam 23, in addition to rigidifying the attachment structure, projects forwardly beyond the hangers 24 and is received between a pair of vertical guide bars 75 and 76 in order to receive lateral support for the forward end of the attachment from the tractor. The space between the guide bars 75 and 76 allows the beam 23 to swing vertically. A bolt 77 limits upward movement of the beam. At this point, it may be stated that the weight of that portion of the attachment rearward of the fulcrum shaft 61 somewhat overbalances the weight of the picker unit A and the weight is therefore supported in a normal position by the bolt 77. Tilting of the picker unit is desirable ordinarily only to meet certain conditions such as the picking up of a fallen stalk or dipping downwardly into a hollow. The normal position of the picker arms is an elevated position.

Consequently it is desirable that the attachment shall lie in a normal position without support from the tilting lever and that the latter shall be used only for tilting the nose downwardly.

Tilting mechanism

The tilting connection includes a tilting lever 80, fulcrumed at 81 upon a bracket 82 (see Fig. 5) which is hung from the fender 13 as shown and attached at its lower end to an auxiliary stud 83 secured to the hub of the wheel 19. A lateral extension 85 makes of the lever 80 a bell crank construction and this lateral extension is linked with a bracket 86, secured beneath an arm 21, by means of a link 79.

It will now be seen that forward pressure exerted against the lever 80 will transmit lifting movement to the attachment frame rearwardly of the fulcrum shaft 61, causing the nose of the picker to be tilted downwardly. Being positioned just outside of the right rear wheel the lever 80 is accessible from the seat 16 of the tractor.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A picking attachment for a tractor having a belt pulley shaft housing projecting laterally ahead of a rear wheel, comprising: a sleeve to receive the housing, means attached to the sleeve and attachable to the tractor body, for securing the sleeve on the housing and for supporting the outer end of the sleeve, and a picker frame tiltably supported by the sleeve.

2. A picking attachment for a tractor having fenders and a belt pulley shaft housing projecting laterally ahead of a rear wheel, comprising: a sleeve to receive the housing, means attached to the sleeve and attachable to the tractor body, for securing the sleeve on the housing and for supporting the outer end of the sleeve, a picker frame tiltably supported by the sleeve, a hanger secured to the fender, a bell crank lever pivoted on the hanger, and projecting upwardly within reach of the operator's seat, and a link connecting the lever to the frame in such a manner that horizontal movement of the lever will induce vertical tilting of the picker frame.

3. A picking attachment for a tractor having a belt pulley shaft housing projecting laterally ahead of a rear wheel, comprising: a sleeve to receive the housing, means attached to the sleeve and attachable to the tractor body, for securing the sleeve on the housing and for supporting the outer end of the sleeve, a picker frame tiltably supported by the sleeve, said frame including a longitudinal portion positioned between the tractor body and a rear wheel thereof, a longitudinal portion positioned beyond the said rear wheel, and transverse portions behind and ahead of the rear wheel.

4. A picking attachment for a tractor having a belt pulley shaft housing projecting laterally ahead of a rear wheel, comprising: a sleeve to receive the housing, means attached to the sleeve and attachable to the tractor body, for securing the sleeve on the housing and for supporting the outer end of the sleeve, and a picker frame tiltably supported by the sleeve, said frame including a longitudinal beam positioned between the tractor body and rear wheel, and a vertical slideway secured to the tractor body near its forward end, the beam being received in said slideway.

Signed this 25th day of February, 1930, in the county of Woodbury and State of Iowa.

NICHOLAUS W. FRANZKOWIAK.